(12) United States Patent
Haramaki et al.

(10) Patent No.: US 6,452,101 B1
(45) Date of Patent: Sep. 17, 2002

(54) MULTI-CORE CONDUCTIVE WIRE AND A METHOD OF MANUFACTURING THE SAME

(75) Inventors: Takashi Haramaki, Tokai-mura; Izumi Sakurai; Yoshitaka Kojima, both of Hitachi, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/485,157

(22) PCT Filed: Aug. 6, 1999

(86) PCT No.: PCT/JP99/04267

§ 371 (c)(1),
(2), (4) Date: Feb. 4, 2000

(30) Foreign Application Priority Data

Aug. 11, 1998 (JP) .......................................... 10-226688

(51) Int. Cl.$^7$ ............................................. H02G 15/02
(52) U.S. Cl. ................................ 174/74 R; 174/128.1; 174/129 R
(58) Field of Search ...................... 174/74 R, 128.1, 174/84 C, 128.2, 129 R, 133 R

(56) References Cited

U.S. PATENT DOCUMENTS

| | | | |
|---|---|---|---|
| 389,752 A | * 9/1888 | Lauckert | 174/129 R |
| 587,764 A | * 8/1897 | Short | 174/129 R |
| 2,623,918 A | * 12/1952 | Hartwell | 174/106 R |
| 2,978,530 A | * 4/1961 | Braeckman | 174/119 R |

FOREIGN PATENT DOCUMENTS

| | | | |
|---|---|---|---|
| JP | 5113279 | | 9/1980 |
| JP | 63-198275 | * | 8/1988 |
| JP | 1-292775 | * | 11/1989 |
| JP | 5-290640 | * | 11/1993 |

* cited by examiner

Primary Examiner—Chau N. Nguyen
(74) Attorney, Agent, or Firm—Antonelli, Terry, Stout & Kraus, LLP

(57) ABSTRACT

An object of the invention is to provide a multi-core conductive wire having the small number of manufacturing processes and a terminal with high strength, and a method of manufacturing the multi-core conductive wire.

The multi-core conductive wire is provided with a terminal, at the end portion thereof, where individual strands of the multi-core conductive wire are entangled with each other and the terminal is molded by subjecting to pressure-molding.

A method of manufacturing a multi-core conductive wire comprises a step of processing the multi-core conductive wire into a state where individual strands of the multi-core conductive wire are partially entangled with each other; a step of temporarily molding the processed portion; and a step of further applying pressure to the temporarily molded portion for pressure-molding or plastic working.

10 Claims, 7 Drawing Sheets

F I G. 11A 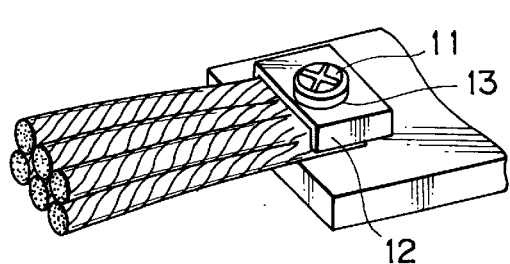
F I G. 11B 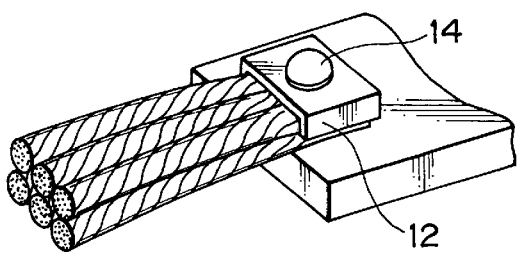
F I G. 12A 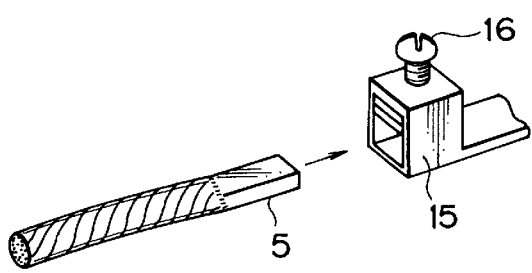
F I G. 12B 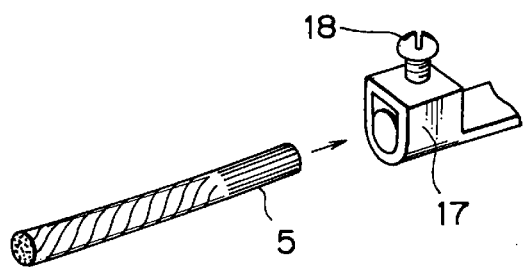
F I G. 13
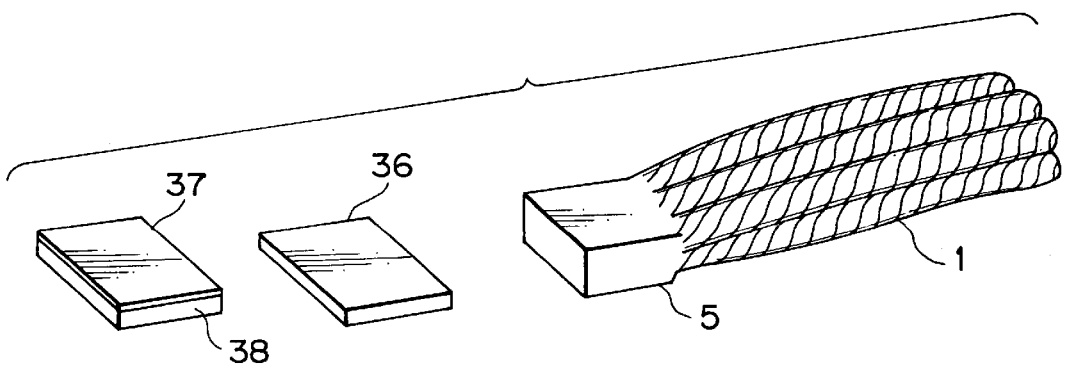

MULTI-CORE CONDUCTIVE WIRE AND A METHOD OF MANUFACTURING THE SAME

TECHNICAL FIELD

The present invention relates to a novel multi-core conductive wire to be used for various sorts of electric equipment, and more particularly to a multi-core conductive wire having a novel terminal and its manufacturing method.

BACKGROUND ART

In the prior art, various methods have been used as a processing method of a terminal portion of a multi-core conductive wire (called conductive wire and multi-core wire) to be used in electric equipment. As called a multi-core conductive wire, since a large number of wires are used in the conductive wire, a simple method of processing a terminal portion in such a multi-core conductive wire has not been yet established, being in difficulties.

On the other hand, in the processing of the terminal portion of the multi-core conductive wire, also such technology is demanded that other material wrapping the multi-core conductive wire is not used but the processing can be performed by only the multi-core conductive wire.

As a method of processing a terminal portion in the prior art, when a relatively small number of multi-core conductive wires are used, the conductive wires are fixedly secured to each other using a resistance welder. When a large number of multi-core conductive wires are used, the fixing by the resistance welder is restricted. Therefore as a fixing method in the present state, plating is applied to the individual multi-core conductive wires and the terminal portion is fixedly secured by the resistance welder utilizing the plating.

Respective methods have some merits and demerits. For example, with the former, if the wires are welded with each other, the wires are heated up to the processing temperature which may attain to the melting point thereof. Therefore the thermal damage of the wires themselves becomes great, resulting in increase of the resistance being fatal as the electric equipment. Also with the latter, since the plating is applied to the individual wires, the price of the wires themselves becomes expensive. Further flexibility required as other factor is deteriorated due to the plating film and the fixing by the resistance welding.

As above described, any method of processing a terminal portion in the prior art has some disadvantages. As a result, it is difficult to process a terminal portion of a multi-core conductive wire with high quality.

In order to connect a terminal portion to other connection terminal, such a method is generally performed that a conductive wire is inserted in a connecting conductor terminal, and the terminal having lateral spread and the conductive wire are joined with each other by means of soft soldering or caulking. That is, a conductive wire peeled off an insulation tube is inserted into a connecting conductor terminal and is soldered by means of soft soldering. Otherwise, a conductor wire peeled off an insulation tube is inserted into a connecting conductor terminal and is pressure-contacted for connection by a caulking machine. The above-mentioned connection in the processing of the terminal portion of the multi-core conductive wire is performed by other material for wrapping the multi-core conductive wire.

Japanese Patent Laid-open No. Hei 1-292775 discloses a method that an end portion of a multi-core conductive wire is previously inserted in a metal cylinder, and the metal cylinder is processed and molded into a terminal. Also Japanese Patent Laid-open No. Sho 55-113279 discloses that an end portion of a multi-core conductive wire is bundled by a wire, and then is subjected to pressuremolding into a flat end portion and is brazed with other conductor by resistance heating.

In rotary machines such as a motor or an AC generator, or electric equipment for electric facilities of an automobile, for a breaker or the like, in order to exhibit functions respectively, multi-core conductive wires are used widely as conductive wires. Processing of a terminal portion plays a very important role. Two methods are used in processing of a terminal portion. One is the case that a terminal portion of a conductive wire is connected to other connection terminal as above described, and the other is the case that a terminal portion of a conductive wire is fixedly secured and is treated as a single article. Even in a single article of the latter, it may sometimes be coupled with other conductor terminal. The multi-core conductive wires are used in various sorts of electric equipment. Attendant on this, various sorts of conductor wires are applied. That is, there are conductive wires being different from each other in the diameter of wire, the number of wires or the like. Therefore it is desirable that processing of terminal portions of these conductive wires be easily performed.

When the number of the conductive wires in the terminal portion is in the range of three to a large number (for example, 10,000), and moreover a range of the wire diameter is, for example, from 0.10 mm to 1.5 mm, approximately, it is very difficult that all different conductive wires are fixedly secured together in the method of the prior art. Thus such structure for a terminal portion with high reliability has been desired strongly that terminal portions of many conductive wires having wire diameters ranging from smaller one to larger one can be fixedly secured without raising the heating temperature in the terminal portions if possible and without applying the plating or the like to the wires if possible.

The methods disclosed in Japanese Patent Laid-open No. Hei 1-292775 and Japanese Patent Laid-open No. Sho 55-11327 have problems in that the coupling force between the wires is weak and further the number of the manufacturing processes is much.

An object of the present invention is to provide a multi-core conductive wire having the small number of manufacturing processes, a terminal with high strength, and a method of manufacturing the multi-core conductive wire.

DISCLOSURE OF INVENTION

The present invention provides a multi-core conductive wire wherein in such irregular and uneven state that a molded end portion of a multi-core conductive wire or individual strands of the multi-core conductive wire are partially entangled with each other in disorder, the multi-core conductive wire is subjected to compression-molding, pressure-molding or plastic working.

The present invention provides a multi-core conductive wire wherein in such irregular and uneven state that a molded end portion of a multi-core conductive wire or individual strands of the multi-core conductive wire are partially entangled with each other in disorder, the multi-core conductive wire is subjected to processing or molding in similar manner to that as above described, and a hole or the like to enable connection to other connection terminal is processed.

The present invention provides a multi-core conductive wire wherein in such irregular and uneven state that a molded end portion of the multi-core conductive wire is entangled or the multi-core conductive wire is entangled with a molding assisting material in disorder, the multi-core conductive wire is subjected to processing or molding, and a hole or the like to enable connection to other terminal is processed.

As a molding assisting material as above described, preferably a material is selected from the group of consisting of copper, tin, lead, silver and indium and molded in linear shape, powder state, band shape, plating, thermal spraying or the like.

For a multi-core conductive wire which has a wire diameter ranging from 0.01 mm to 1.5 mm and the number of wire not less than 30 preferably not less than 100, the wire material of Cu, Al, Ag, Au or the like, may be used.

In the molded terminal structure of the present invention, it is preferable that the conductor wires being different in the wire diameter be combined, and that different wire materials be combined.

The present invention is characterized in that the multi-core conductive wire with the terminal portion subjected to molding as above described is connected to other conductor terminal.

The present invention provides a method of manufacturing a multi-core conductive wire, comprising: a processing step of molding an end portion of the multi-core conductive wire into irregular and uneven state where the end portion of the multi-core conductive wire or individual strands of the multi-core conductive wire are partially entangled with each other; a processing step of temporarily molding said molded end portion; and a step of applying compression- or plastic-working to said processed end portion and processing it into the molded article.

In the present invention, in order that the multi-core conductive wire has the electric performance, in view of the necessity for the terminal portion to be integrated at first, it is preferable that molding to desired shape be performed in cold processing without thermal damage, and that the terminal portion molded in cold processing be connected substantially to other electric conductor terminal.

The terminal portion molding can be achieved in that one end of the multi-core conductive wire is untied and the strands are entangled with each other in disorder, in irregular and uneven state for molding. The thus molded terminal portion can be sufficiently connected to other conductor terminal. The molded article can be provided with a hole or the like during the molding, and can be screwed utilizing the hole and also can be joined using a general brazing.

That is, the multi-core conductive wire of the present invention is constituted by stranded wire of copper. In this case, the multi-core conductive wire is constituted by six bundles of the stranded wires. The end portion is molded in such irregular and uneven state that the multi-core conductive wires are entangled with each other, and is integrally molded.

In some case, the end portion is connected to other conductor terminal. As an example of the joining method, resistance brazing using a resistance welder is preferable. The resistance welder is used here. Because the heating and the pressure applying can be performed simultaneously, and the joining can be performed in a short time. Since the joining is performed in the atmosphere in almost case, the shorter the joining time, the less the reaction with oxygen. Thus the good joint can be obtained. In order to make the junction more reliable, it is preferable that the resistance welder adopt the heating and pressure applying system in two stages.

In the case of the multi-core conductive wire, in the heating and the pressure applying at the first stage, the solder material with high resistance value is heated, and at the same time of the heating of the solder material, also the multi-core conductive wire is heated to certain temperature, and in the heating and pressure applying at the second stage, the material is melted and wets the wires of the multi-core conductive wire. Even if the solder material before the wires of the multi-core conductive wire are heated at a time, it is not liable to wet. Consequently the heating in the two stages is more preferable. The heating and pressure applying system in the two stages is a system to be used in the case where the multi-core conductive wires are relatively much. When the multi-core conductive wires are relatively a little, the heating and pressure applying system in one stage can perform the joining well.

As a solder material to be used in the present invention, a solder material containing phosphorous is preferable. As a solder material containing phosphorous, a solder material constituted by Cu alloy containing P 3 to 8%, further Ag 4 to 7% or 13 to 17% by weight, is preferable. Further such solder material may contain Sn and Au of 5% or less. In the solder material, during the joining, phosphorous removes oxide from the material to be joined and the wettability of the solder is improved and flux becomes unnecessary although it is usually required in the solder material. Thus the washing after the joining need not be performed, and the corrosion of the material to be joined due to the remaining of the flux used conventionally can be eliminated. Since the solder material containing phosphorous is preferably used in the resistance brazing, the solder foil is preferably arranged in the joining interface. Its thickness and width are determined by size of the molding structure.

When a hole is provided on the end portion of the multi-core conductive wire, the end portion can be connected mechanically to other conductor. The hole is produced by processing at the same time during the cold molding.

As a multi-core conductive wire material to perform the molding in the present invention, bare copper wire is used at almost case. In order that the compression force during the molding is decreased and the fixing force of the molded portion is made stronger, use of the molding assisting material is effective. Although various substance may be considered as the joining assisting material, selection of material softer than the multi-core conductive wire itself is preferable. Because when the molding is performed using the die, the soft material is elongated by the pressure application and is entangled with the wires of the multi-core conductive wire and has effect of improving the adhesibility of the multi-core conductive wire. As the material, soft copper, tin, lead, silver, indium or the like is recommended. The form in linear shape, powder state, band shape, plating, thermal spraying or the like is recommended.

In the state of molding the multi-core conductive wire, straight wire, stranded wire, net wire and the like are applied, and the size and the wire diameter of the multi-core conductive wire are varied in response to the conduction current in the electric performance.

Condition required in the multi-core conductive wire is the processing of the terminal portion of the multi-core conductive wire, in other words, that the conductive wires are electrically conducted with each other without fail, and that malfunction is not produced for use in a long period of time. In order to satisfy such condition, individual strands of the multi-core conductive wire are entangled with each other and the adhesibility between the strands is molded well.

As above described, the molded terminal structure portion of the multi-core conductive wire by the cold pressure-molding is molded in such irregular and uneven state that the strands are entangled with each other in disorder. Thus high fixing force and high binding force are exhibited between the individual strands and the molded terminal structure portion has high strength.

Also when the compressed terminal molded article is connected to other conductor terminal, for example, in the connection by brazing, the solder material wets both terminals and thereby good joining can be achieved. Also in the connection by screw or rivet system, electrically stable characteristics can be obtained.

In the molded terminal structure portion manufactured in such a manner, it is proved that the fixing force of the molded terminal structure portion itself is high. Also in the connection to other terminal portion, the satisfactory state can be obtained. That is, the molded terminal structure portion with little thermal damage can be obtained, and the multi-core conductive wire with high reliability can be confirmed.

In the multi-core conductive wire, various materials, such as electric copper wire, or silver wire, gold wire or respective wire materials subjected to, for example, tin plating called in JIS, can be applied as multi-core conductive wire of the present invention. As the terminal portion, also in shape such as square wire or elliptical wire, the manufacturing can be performed by the cold pressure-molding structure of the present invention.

In the multi-core conductive wires applied in the present invention, since bare wires are much used, the measure taking anticorrosive property and acid resisting property into consideration is effective. For example, it is confirmed that covering a lead wire and a terminal portion with an insulator contributes to improvement of reliability.

In rotary machines such as a motor or an AC generator, or electric equipment for electric facilities of an automobile, for a breaker and the like, in order to exhibit respective functions, multi-core conductive wires are used much and the present invention is used for these applications.

BRIEF DESCRIPTION OF DRAWINGS

FIGS. 11A and 11B are perspective views showing a structure where a terminal portion of a multi-core conductive wire is screwed to other conductor terminal using a hole, and a structure where a terminal portion of a multi-core conductive wire is riveted to other conductor terminal using a hole;

FIGS. 12A and 12B show structures molded by forming condition of the fifth embodiment of the invention, where FIG. 12A is a perspective view showing a state where a square type terminal portion of a multi-core conductive wire is connected to other conductor terminal, and FIG. 12B is a perspective view showing a state where a round type terminal portion of a multi-core conductive wire is connected to other conductor terminal;

FIG. 13 is a perspective view of a multi-core conductive wire shown in the sixth embodiment of the invention;

BEST MODE FOR CARRYING OUT THE INVENTION

Embodiment 1

A multi-core conductive wire is constituted in that a bundle of Cu-stranded wire is formed by 2,413 wires each having a diameter of 0.05 mm, and six bundles of stranded wires constituted by 14,478 wires are arranged in three rows and two stages in an arbitrary length (70 mm in this case) and then are molded by cold compression.

Figure 1:
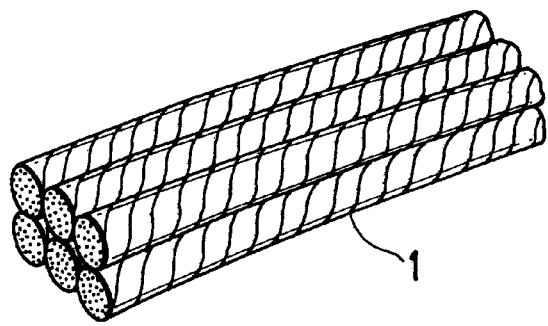
FIG. 1 is a perspective view of a multi-core conductive wire of the invention cut in a prescribed length.
Figure 2:
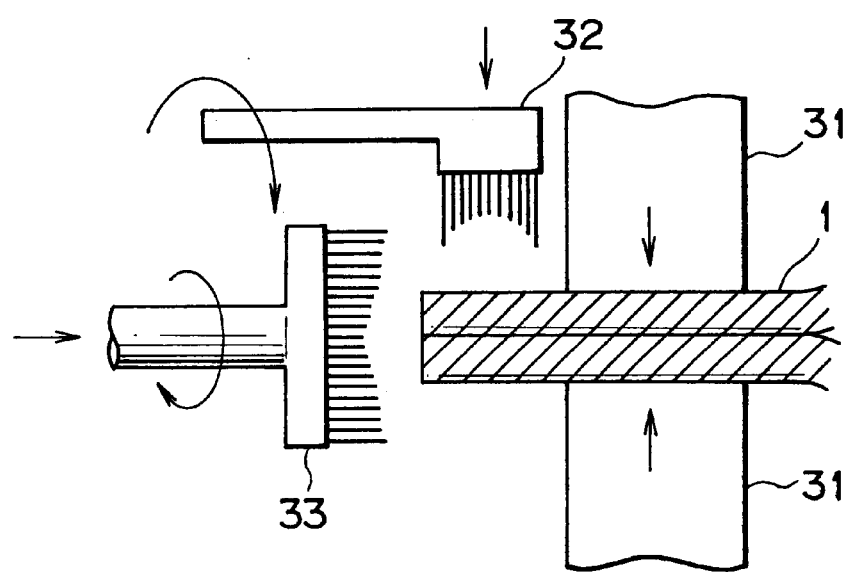
FIG. 2 is a constitution diagram of an apparatus for molding an end portion of a multi-core conductive wire of the invention in entangled state.
Figure 3:
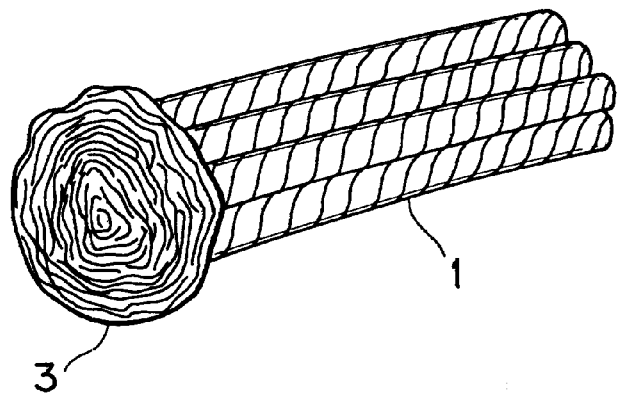
FIG. 3 is a perspective view of a terminal portion of a multi-core conductive wire where one end is untied and entangled in irregular and uneven state in disorder.

The basic manufacturing processes of cold pressure-molding of the present invention will be described as follows. At first, as shown in FIG. 1, multiconductor stranded wires 1 are cut in a prescribed length and overlaid in two stages to form six bundles. As shown in FIG. 2, one end of the six bundles is drawn by a prescribed length to be fixed by a holding jig 31. While a circumferential rotary brush 32 is rotated in the circumferential direction, the end portion of the multi-core stranded wires 1 is rotated by an axial rotary brush 33 rotating about the axis. As a result, as shown in FIG. 3, the multi-core stranded wires 1 are twisted, and while the multi-core stranded wires 1 are rotated by the brush, a lump state 3 is produced where strands are entangled in disorder irregularly and unevenly. Before the lump state 3 is produced by the rotary brush, the multi-core stranded wires 1 are held at a prescribed length, and the end portion 2 of the multi-core stranded wires 1 is once disentangled and extended from the center to the outside.

Figure 4:
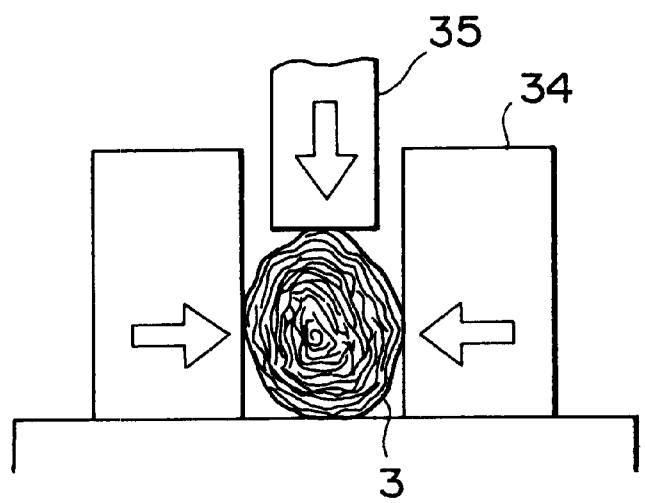
FIG. 4 is a perspective view of an apparatus performing temporary molding of the end portion.
Figure 5:
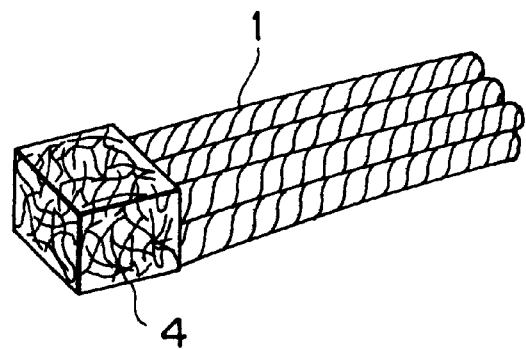
FIG. 5 is a perspective view showing a temporary molding state of the end portion.
Figure 6:
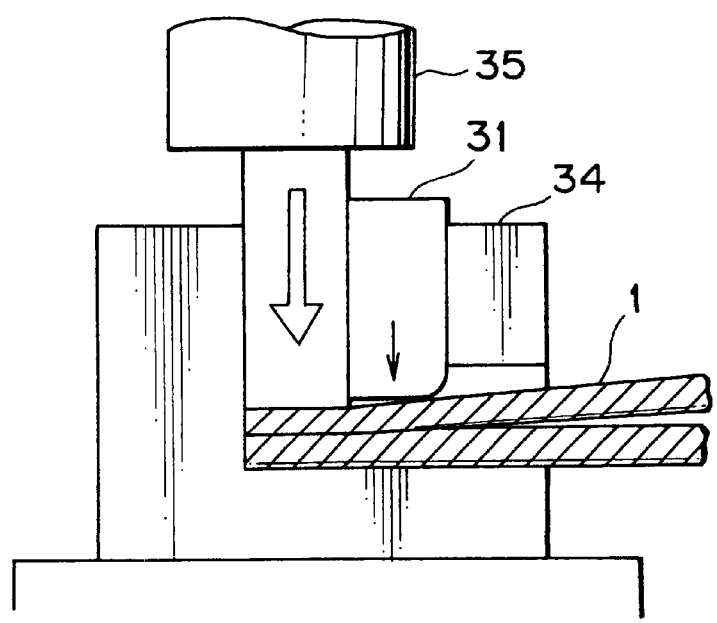
FIG. 6 is a constitution diagram of a press performing pressure-molding of the end portion.
Figure 7:
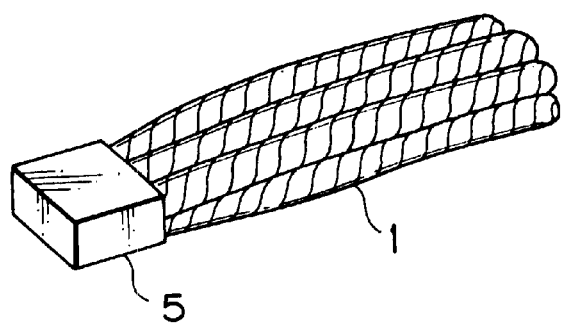
FIG. 7 is a perspective view of a multi-core conductive wire having the end portion manufactured by pressure-molding of the invention.

Next, as shown in FIG. 4, pressure is applied by a die 34 using a punch 35 and thereby a temporary molding portion 4 is provided, and as shown in FIG. 5, a shape larger than the size of the six bundles of the stranded wires is produced. The temporary molded portion 4 is arranged in a press shown in FIG. 6, the end portion is fixed by the holding jig 31 and a pressure of two to four tons is applied thereto by the punch 35 to form a terminal 5 of a prescribed shape as shown in FIG. 7. The terminal 5 has a shape of 8.2 mm×8.1 mm and about 4.5 mm in thickness.

Figure 8:
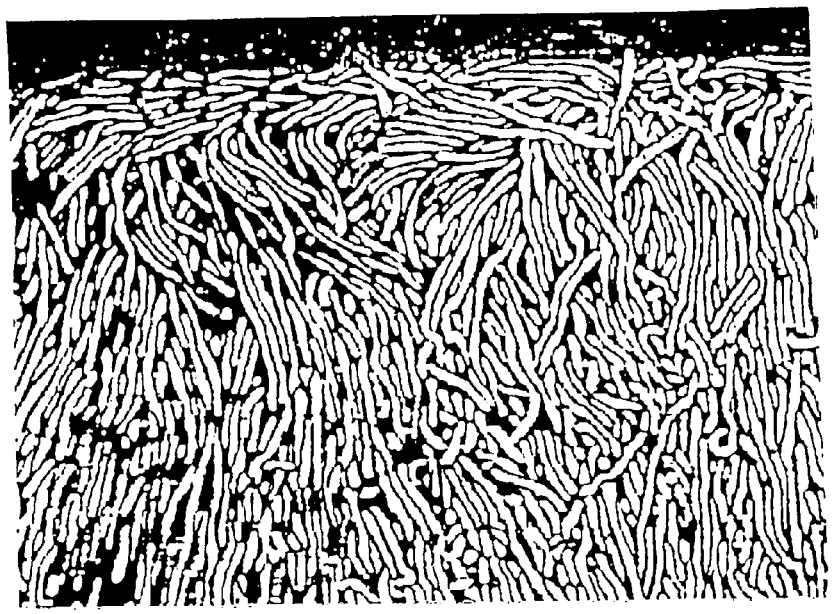
FIG. 8 is a photograph by a microscope showing section of a molding portion molded in the first embodiment of the invention.

Thus the end portion of one or plural bundles of multi-core conductive wires can be molded in a prescribed shape and integrated by cold processing. As above described, with the integrated terminal 5, the stranded wires 1 are entangled with each other irregularly and unevenly. FIG. 8 shows the section of the entangled stranded wires observed in a magnification of×20. In FIG. 8, the upper side shows the outside of the terminal 5 and the lower side shows the inside of the terminal 5. As shown in FIG. 8, in the surface of the terminal 5, the stranded wires of the multi-core conductive wires are entangled with each other irregularly in various directions by the rotary brush and are subjected to work deformation. Then, the stranded wires are subjected to deformation along the pushing surface of the punch and molded in the laterally laid state to the punch surface. The depth in the laterally laid state of the individual wires is about 0.5 to 1 mm. The depth in the laterally laid state of the individual wires in such manner is proportional to a degree of applied pressure. In this embodiment, the applied pressure of 0.2 mm or more is preferable.

Embodiment 2

A multi-core conductive wire is constituted in that Cu straight wires formed by 4,040 wires each having a diameter of 0.1 mm are arranged in an arbitrary length (70 mm in this case) and then are molded by cold compression.

The manufacturing processes of cold pressure-molding of this embodiment are performed similarly to those of the first embodiment. At first, as shown in FIG. 1, multi-core straight wires 1 are cut in a prescribed length. As shown in FIGS. 2 and 3, one end of the wire materials is fixed at a prescribed length, and the end portion 2 of the multi-core straight wires is extended from the center to the outside. Next, the end portion 2 is rotated and twisted by a brush. While the multi-core straight wires are rotated by the brush, a lump state 3 is produced where strands are entangled with each other in disorder irregularly and unevenly. Next, as shown in FIG. 4, a temporary molded portion 4 is provided by a die, and as shown in FIG. 5, a shape larger than the size of the four bundles of the straight wires is produced. Pressure is applied to the temporary molded portion 4 by a press shown in FIG. 6 to form a terminal 5 of a prescribed shape as shown in FIG. 7. The molded article has a shape of 6.2 mm×6.1 mm and 3.5 mm in thickness. In this time, the pressure of the press is about 3.2 tons.

Thus the end portion of the multi-core straight wires can be molded in a prescribed shape and integrated by cold processing. In the integrated molded portion, the strands are entangled with each other irregularly and unevenly as shown in FIG. 8.

Embodiment 3

Figure 9A:
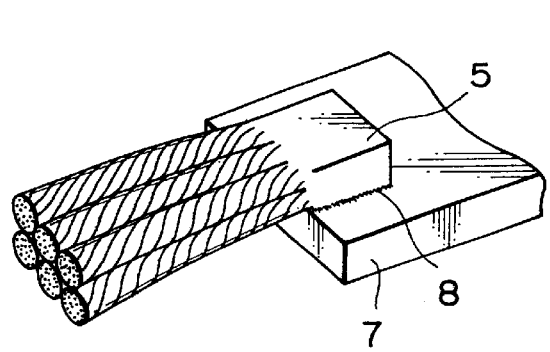
FIGS. 9A and 9B are perspective views showing a structure where a terminal portion of a multi-core conductive wire is joined with other conductor terminal by solder material, and a structure where a terminal portion of a multi-core conductive wire is connected to other conductor terminal by rivet.

FIG. 9 shows an example where a molded end portion of six bundles of multi-core conductive wires manufactured under the condition of the first embodiment is connected to another terminal plate 7. FIG. 9A shows an example of connection by brazing. A conductor terminal is a Cu-plate with a thickness of 4 mm to which Ag plating is applied, and resistance brazing is performed to the conductor terminal by a resistance welder. A brazing material 8 is a solder of copper phosphide, composed by weight of P 5%, Ag 15% and Cu the remainder. The brazing material has a thickness of 0.13 mm.

The resistance brazing condition is as follows: First stage heating: applied pressure 45 kg, current 6.2 kA, 1 sec Second stage heating: applied pressure 45 kg, current 6.8 kA, 1.5 sec As a result, the molded multi-core conductive wire end portion and the conductor terminal are successfully joined with each other by copper phosphide solder.

Figure 9B:
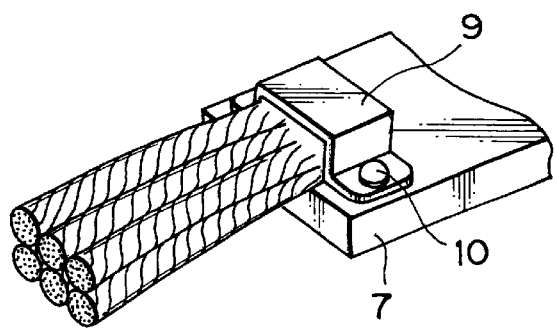

FIG. 9B shows an example of connection by a rivet 10 using a fitting 9. The fitting 9 protects a terminal 5 and serves as a connection plate to other terminal platge 7. A hole 6 of the fitting 9 and a hole of the terminal are tightened by the rivet 10 to be fixed. As the material for the rivet 10, Cu, Cu alloy, Al alloy, Fe series or the like can be applied. If the connection is performed in this system, all processings from the molded end portion to the end portion connection are performed in cold treatment, the multi-core conductive wire of the molded end portion structure being excellent in flexibility can be obtained without thermal damage.

Embodiment 4

A multi-core conductive wire is constituted in that a bundle of Cu-wire is formed by 2,413 wires each having a diameter of 0.05 mm, and six bundles of wires constituted by 14,478 wires are arranged in three rows and two stages in an arbitrary length (70 mm in this case) and then are molded by cold compression.

The manufacturing processes of cold pressure-molding of this embodiment are similar to those of the first embodiment. In this embodiment, however, a mandrel is used so as to provide a desired hole diameter during the temporary molding. The molded article has a shape of 0.2 mm×8.1 mm and about 4.5 mm in thickness and the hole diameter is 4.5 mm. In this time, the pressure of the press is about 3 tons.

Figure 10:
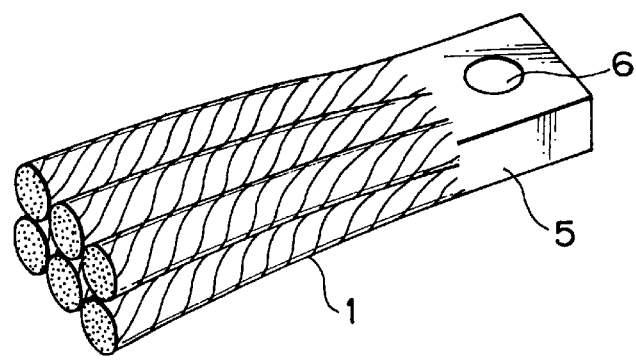
FIG. 10 is a perspective view showing a molding structure with a hole formed by forming condition of the fourth embodiment of the invention.

Thus the end portion of the multi-core conductive wires is molded in a prescribed shape and integrated by cold processing. FIG. 10 shows such a molded structure with a hole.

FIG. 11 shows an example where a molded end portion structure with a hole is connected to other conductor terminal. FIG. 11A shows a structure of screw connection. That is, a fitting 12 is used on the molded end portion and is tightened to a terminal plate 7 by a screw 11 through a washer 13 so that the terminal plate 7 is connected to the molded terminal 5. FIG. 11B shows a structure of rivet connection. That is, a fitting 12 is used on the molded end portion, and a terminal plate 7 and the molded terminal 5 are tightened by a rivet 14 so that the terminal plate 7 is connected to the molded terminal 5.

Embodiment 5

A multi-core conductive wire is constituted in that a bundle of Cu-wire is formed by 2,413 wires each having a diameter of 0.05 mm in an arbitrary length (70 mm in this case) and then molded by cold compression..

The manufacturing processes of cold pressure-molding of this embodiment are similar to those of the first embodiment. The molded article has a shape of 6 mm×2.1 mm and about 2.3 mm in thickness (in FIG. 12A), and has 6 mm in length and a wire diameter of about 2 mm (in FIG. 12B). In this time, the pressure of the press is about 0.8 tons.

The end portion of the multi-core conductive wire manufactured in such manner is connected to other conductor terminals as shown in FIGS. 12A and 12B. FIG. 12A shows a connection example for a molded square shape portion. That is, an end portion 5 subjected to molding in cold processing is inserted into an exclusive connection terminal 15 manufactured previously and the terminal 5 is tightened by a screw 16 of the connection terminal 15 to be integrated. FIG. 12B shows a connection example for a molded round shape portion. That is, an end portion 5 subjected to molding in cold processing is inserted into an exclusive connection terminal 17 manufactured previously, and the terminal portion 5 is tightened by a screw 18 of the connection terminal 17 to be integrated.

In the molded end portion structure by the cold pressure-molding of the multi-core conductive wire in this embodiment, since the strands are entangled with each other in disorder and the terminal portion is molded in the irregular and uneven state, the high fixing force is exhibited.

Comparison Example

A multi-core conductive wire is constituted in that a bundle of Cu-stranded wire is formed by 2,413 wires each having a diameter of 0.05 mm, and six bundles of stranded wires constituted by 14,478 wires are arranged in three rows and two stages in arbitrary length (70 mm in this case) and then molded by cold compression.

These multi-core conductive stranded wires are subjected to cold pressure-molding using a die used in the first embodiment. That is, the multi-core conductive stranded wires are arranged in the die and molded into a prescribed shape by applying a pressure using a press. The molded article has a shape of 8.2 mm×8.1 mm and about 3.2 mm in thickness. In this time, the pressure of the press is about 3 tons.

The fixing force of the molded articles subjected to molding in the embodiments and the comparison example as above described was tested by the peeling-off test. The peeling-off test in the case of the six bundles were divided into the three bundles at the upper stage and the three bundles at the lower stage, and the upper bundles and the lower bundles respectively were grasped by a chuck and pulled by a tension tester. Also in the case of the straight wires, the peeling-off test was performed in that the straight wires were substantially halved, and the respective wires were grasped by a chuck and pulled by a tension tester. Further in the case of a brazed molded article, the peeling-off test was performed in similar manner.

As a result, in the molded articles in the present invention, that in the first embodiment exhibited a fixing force of about 4.5 kg, and that in the second embodiment exhibited a fixing force of about 5.2 kg. Also the molded article in the third embodiment subjected to the brazing exhibited a fixing force of about 4.5 kg.

In the case of the molded article in the comparison example, when the molded article was mounted to the chuck of the tension tester, it collapsed and the strength was zero.

Thus in any molded article manufactured in the present invention, it is clear that the fixing force of the molded portion is high. Also when the molded article is brazed, it is clear that higher fixing force is exhibited.

Also the connection in screw or rivet system has characteristics being electrically stable.

In the molded end portion structure manufactured in such manner, it is clear that the fixing force of the molded end structure itself is high. The satisfactory form can be obtained also in the connection to other conductor terminals. That is, the molded end structure with less thermal damage can be obtained and the multi-core conductive wire in high reliability becomes possible.

Embodiment 6

This embodiment as shown in FIG. 13 is constituted conductive wires 1 being six bundles of stranded wires are obtained as in the first embodiment, and a foil 36 of copper phosphide solder described in the third embodiment is mounted on a terminal 5 of the multi-core conductive wires 1 so that it is brazed to other conductor, is previously molded as a clad on a surface of a copper conductor 38 and the member constituted in this manner is also mounted on a terminal and molded integrally.

Figure 14:
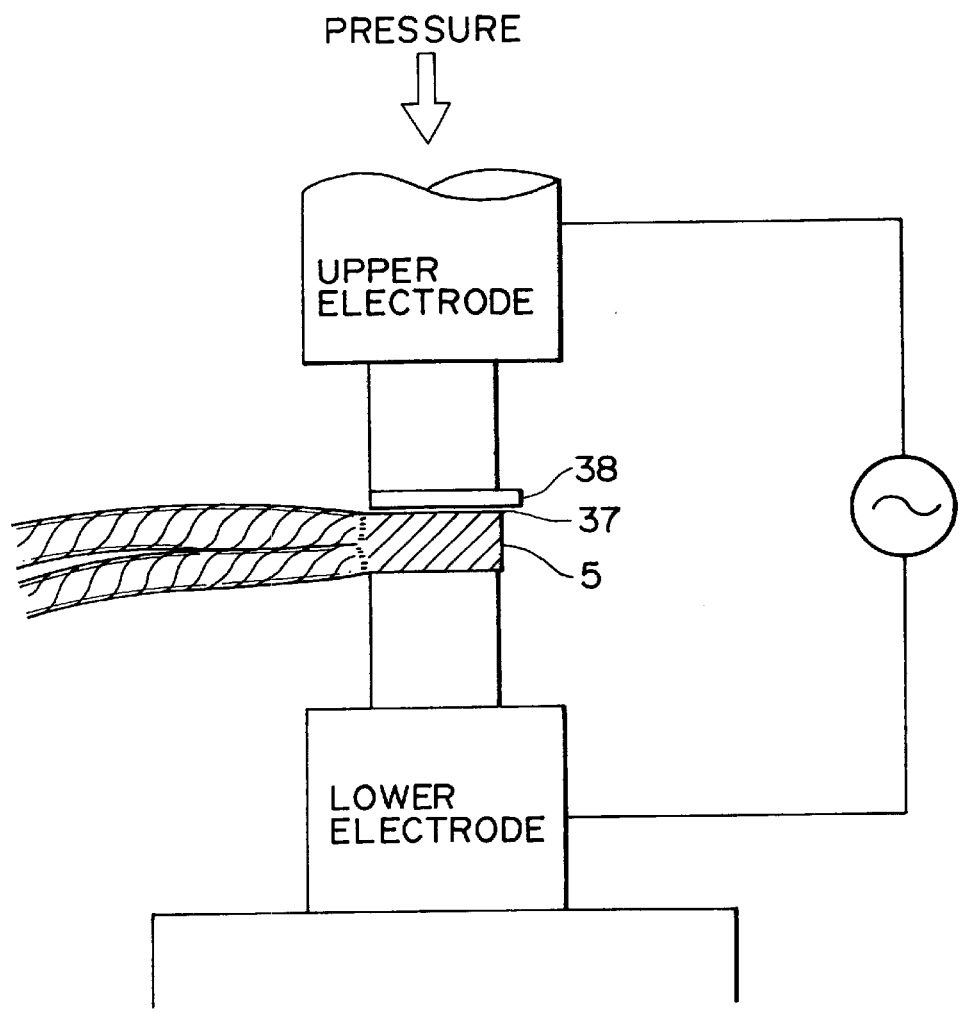
FIG. 14 is a sectional view of a joining apparatus joining a copper conductor with a multi-core conductive wire of the invention.

FIG. 14 is a sectional view of an electric resistance heater where the copper conductor 38 with the solder foil 37 cladded thereon is joined by brazing with the terminal 5 of the multi-core stranded wires 1. The solder foil 37 is held on and contacted with the terminal 5 between an upper electrode and a lower electrode, and pressure is applied and an alternating current is flowed thereto. As a result, the local heating and melting are produced between the terminal 5 and the solder foil 37 and thereby the terminal 5 and the solder foil 37 are joined with each other.

Figure 15:
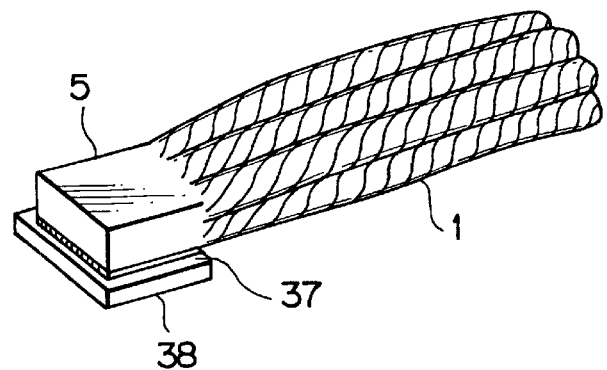
FIG. 15 is a perspective view of a multi-core conductive wire obtained in the sixth embodiment of the invention.

FIG. 15 is a perspective view showing a state where the upper conductor 38 with the solder foil 37 cladded thereon is brazed on the terminal 5 of the multi-core conductive wires 1. Such copper conductor 38 is joined by the solder foil 37 and thereby the solder material is penetrated into the terminal 5 and the terminal with high intensity can be obtained. As shown in FIG. 10, the hole 6 is provided, and the connection to other conductor by the screwing can be performed with high reliability.

Industrial Applicability

According to the present invention, the molded end portion structure of the multi-core conductive wire by the cold pressure-molding is molded in irregular and uneven state where the strands are entangled with each other in disorder. Thus the multi-core conductive wire with high fixing force can be obtained.

Also when the compressed end molded article is connected to other conductor terminals, for example, in the connection by brazing, the solder material wets the terminals and the molded article and hereby good joining can be achieved. Also in the connection by screw or rivet system, electrically stable characteristics can be maintained.

That is, the molded end structure with less thermal damage can be obtained because it is manufactured in the cold pressure-molding. Also the multi-core conductive wire with high reliability is confirmed because the connection portions are connected by the solder material or the like.

What is claimed is:

1. A multi-core conductive wire, comprising a terminal molded at an end portion of the multi-core conductive wire, said terminal being molded by subjecting to pressure-molding into a state where individual strands of the multi-core conductive wire are entangled with each other.

2. A multi-core conductive wire, wherein the multi-core conductive wire is partially integrally molded by plastic working, and individual strands of the multi-core conductive wire are entangled and coupled with each other at the partially integrally molded portion.

3. A multi-core conductive wire, wherein the multi-core conductive wire is partially molded by subjecting to pressure-molding, and individual strands, located at the partially pressure-molded portion, of the multi-core conductive wire are entangled and coupled with each other.

4. A multi-core conductive wire, wherein the multi-core conductive wire constituted by a plurality of bundles is partially integrally molded by subjecting to plastic working, and thereby individual strands of the multi-core conductive wire are coupled integrally with each other.

5. A multi-core conductive wire, wherein an end portion of the multi-core conductive wire constituted by a plurality of bundles is integrally molded by subjecting to pressure-molding, said end portion comprising a terminal molded in such a manner that individual strands of the multi-core conductive wire are entangled and coupled integrally with each other.

6. A multi-core conductive wire as set forth in any one of claims 1 to 5, wherein the portion of the multi-core conductive wire molded by subjecting to pressure-molding or plastic working is connected to other conductor by brazing or mechanical means.

7. A method of manufacturing a multi-core conductive wire, comprising the steps of:
   processing the multi-core conductive wire into a state where individual strands of the multi-core conductive wire are partially entangled with each other;
   temporarily molding the processed portion of the multi-core conductive wire; and
   further applying pressure to the temporarily molded portion for pressure-molding or plastic working.

8. A method of manufacturing a multi-core conductive wire, comprising the steps of:
   processing an end portion of the multi-core conductive wire into a state where individual strands of the multi-core conductive wire are entangled with each other; and
   processing the processed end portion by subjecting to pressure-molding or plastic working;
   wherein the individual strands are coupled with each other so that they are not separated.

9. A method of manufacturing a multi-core conductive wire, comprising the steps of:
   processing an end portion of the multi-core conductive wire constituted by a plurality of bundles into a state where individual strands of the multi-core conductive wire are entangled with each other; and
   processing the processed end portion by subjecting to pressure-molding or plastic working,
   wherein the individual strands are entangled and coupled with each other.

10. A method of manufacturing a multi-core conductive wire as set forth in any one of claims 7 to 9, wherein said multi-core conductive wire comprises stranded wires.

* * * * *